United States Patent [19]

Harrison

[11] Patent Number: 5,406,187
[45] Date of Patent: Apr. 11, 1995

[54] BATTERY CHARGER WITH CAPACITOR SUPPORT

[75] Inventor: Edward A. Harrison, Abingdon, Md.
[73] Assignee: Black & Decker Inc., Newark, Del.
[21] Appl. No.: 860,487
[22] Filed: Mar. 30, 1992
[51] Int. Cl.[6] .................. H01M 10/44; H01M 10/46; H02J 7/00
[52] U.S. Cl. .......................... 320/2; 320/1; 320/3
[58] Field of Search ............. 320/2; 361/306

[56] References Cited

U.S. PATENT DOCUMENTS

| 4,039,900 | 8/1977 | Roback et al. | 361/388 |
| 4,354,092 | 10/1982 | Manabe et al. | 320/2 X |
| 4,719,539 | 1/1988 | Lavene . | |
| 5,001,597 | 3/1991 | Stockman | 361/306 |

FOREIGN PATENT DOCUMENTS 2484691 12/1981 France .
2624334 12/1977 Germany .

OTHER PUBLICATIONS

Instructions Univolt Universal Voltage System Charger: One-Hour No. 98014 Copyright 1988, published by Black & Decker (U.S.) Inc.
B. Grob, Basic Electronics, pp. 7–10, 399–402, 407, 408, 477–483 (1989) (Sixth Edition).
T. Frederiksen, Intuitive Analog Electronics, pp. 82–85, 187–189 (1989).

*Primary Examiner*—Steven L. Stephan
*Assistant Examiner*—Nicholas Ponomarenko
*Attorney, Agent, or Firm*—Dennis A. Dearing; John D. Del Ponti; Charles E. Yocum

[57] ABSTRACT

An electrical device 11 (e.g., a battery charger) has a support 53, 55 for simply, economically and stably mounting a large electrical component 21 (e.g., a capacitor) in a housing 13 and relative to a printed circuit board 19. Housing 13 of device 11 has a cover portion 15 and a base portion 17. Cover portion 15 has a first support 53. Base portion 17 has a second support 55. Printed circuit board 19 is mounted in base portion 17. Electrical component 21 has projecting core end segments 61, 63 which are particularly suitable for clamping between legs 67, 69 of support 53 and cradles 83, 89 of support 55.

9 Claims, 5 Drawing Sheets

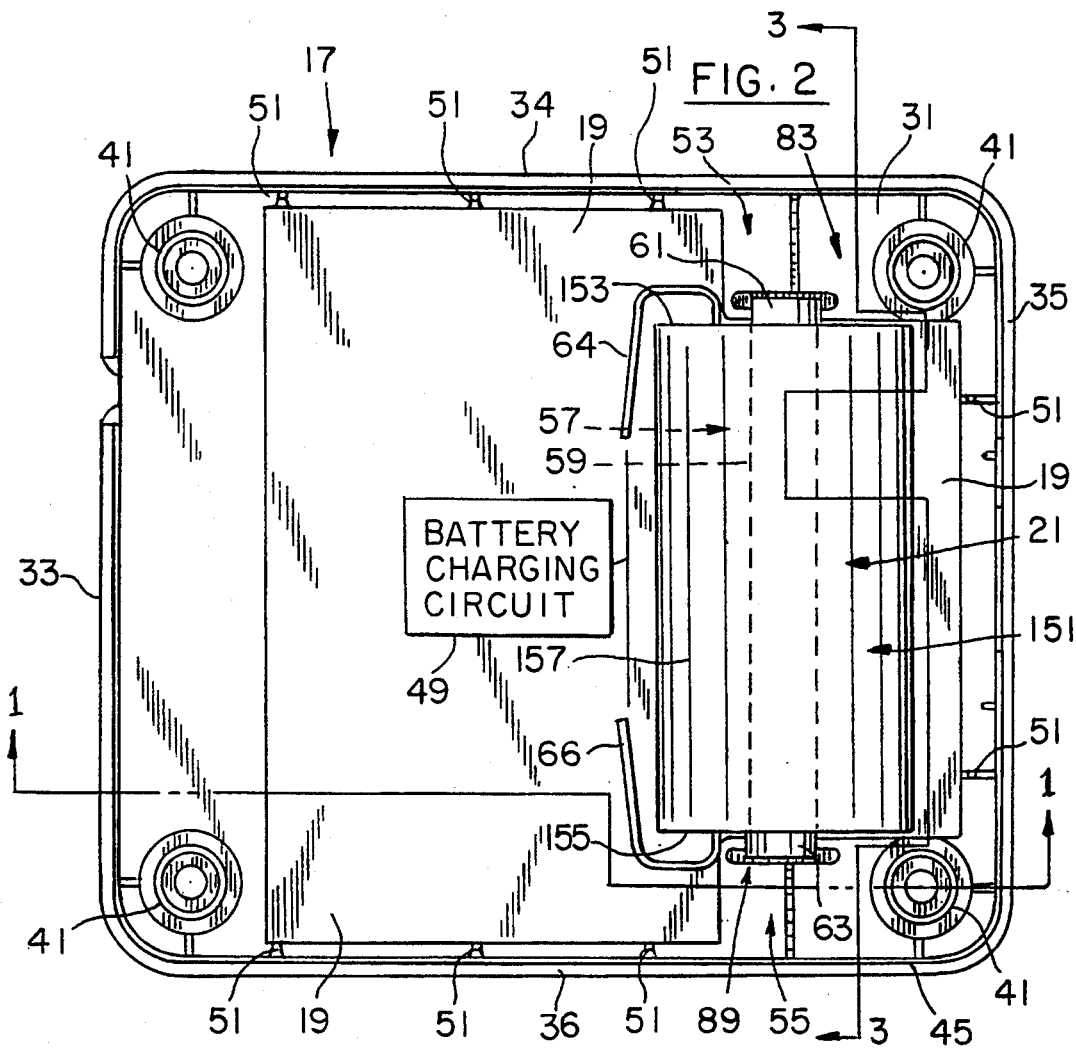
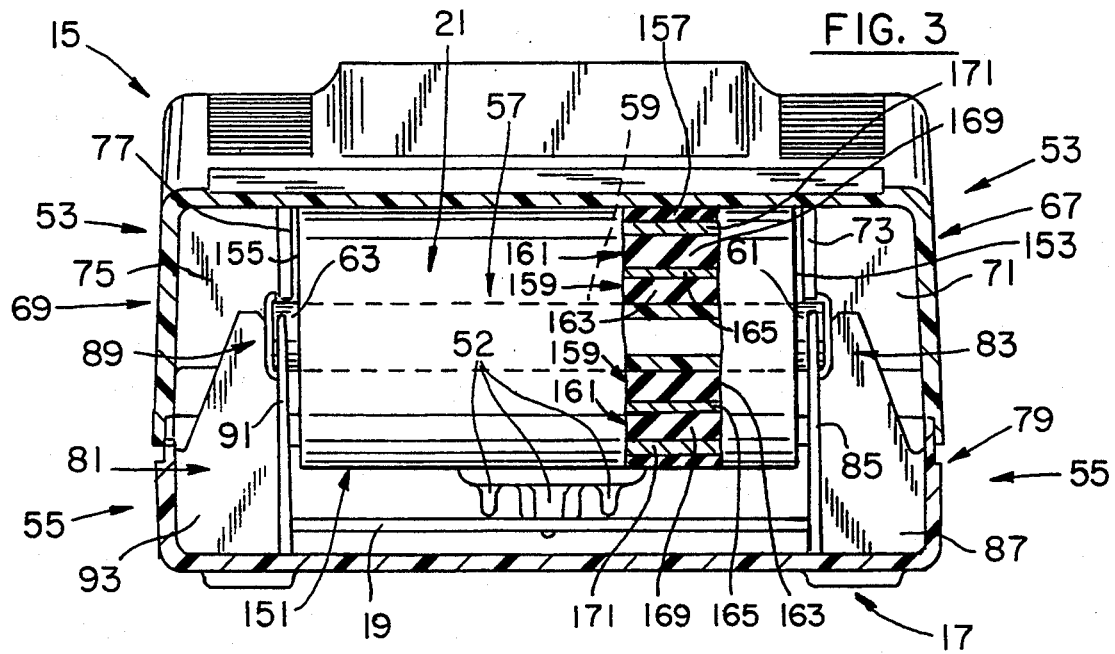

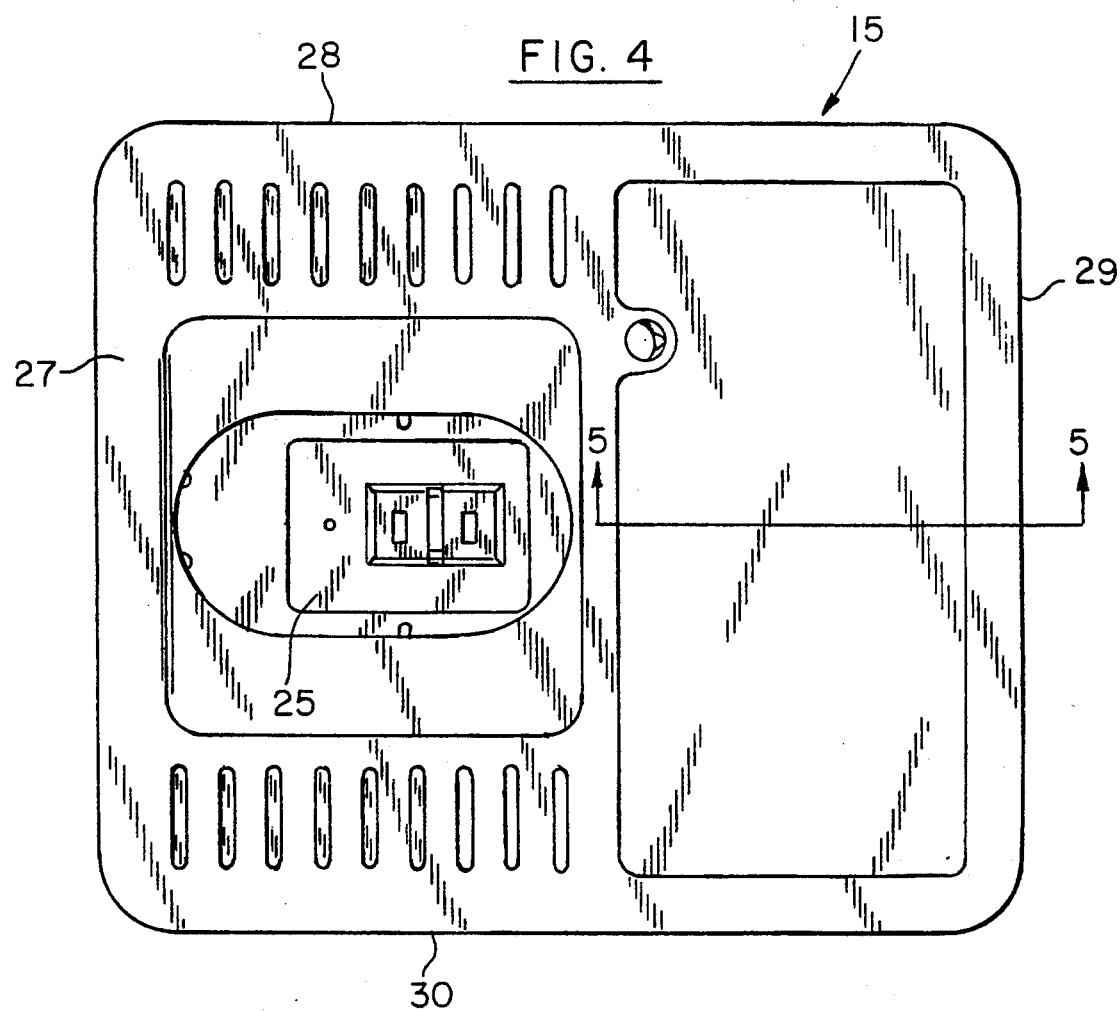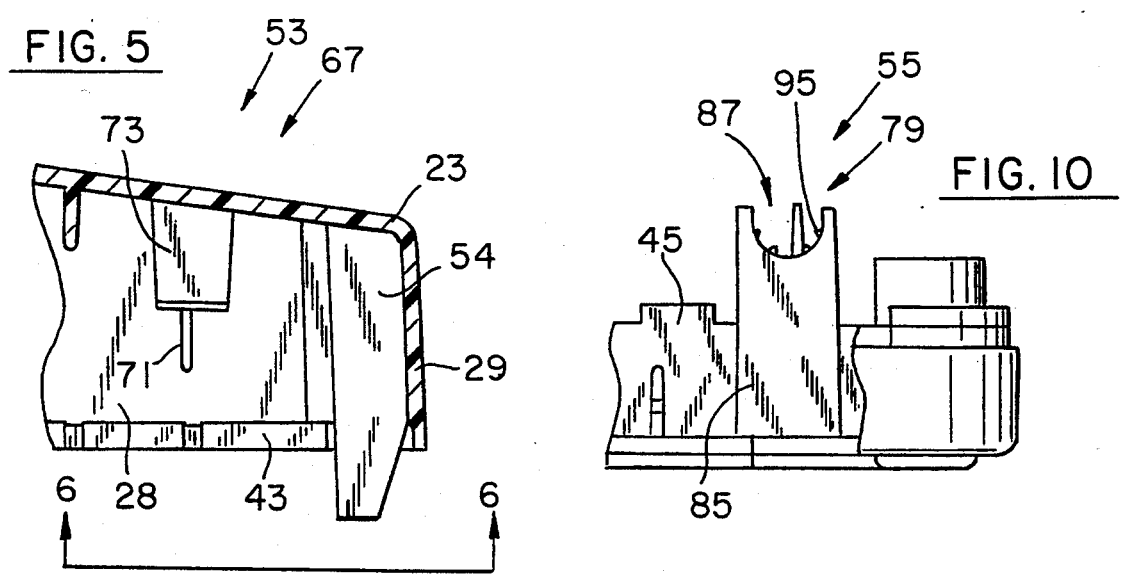

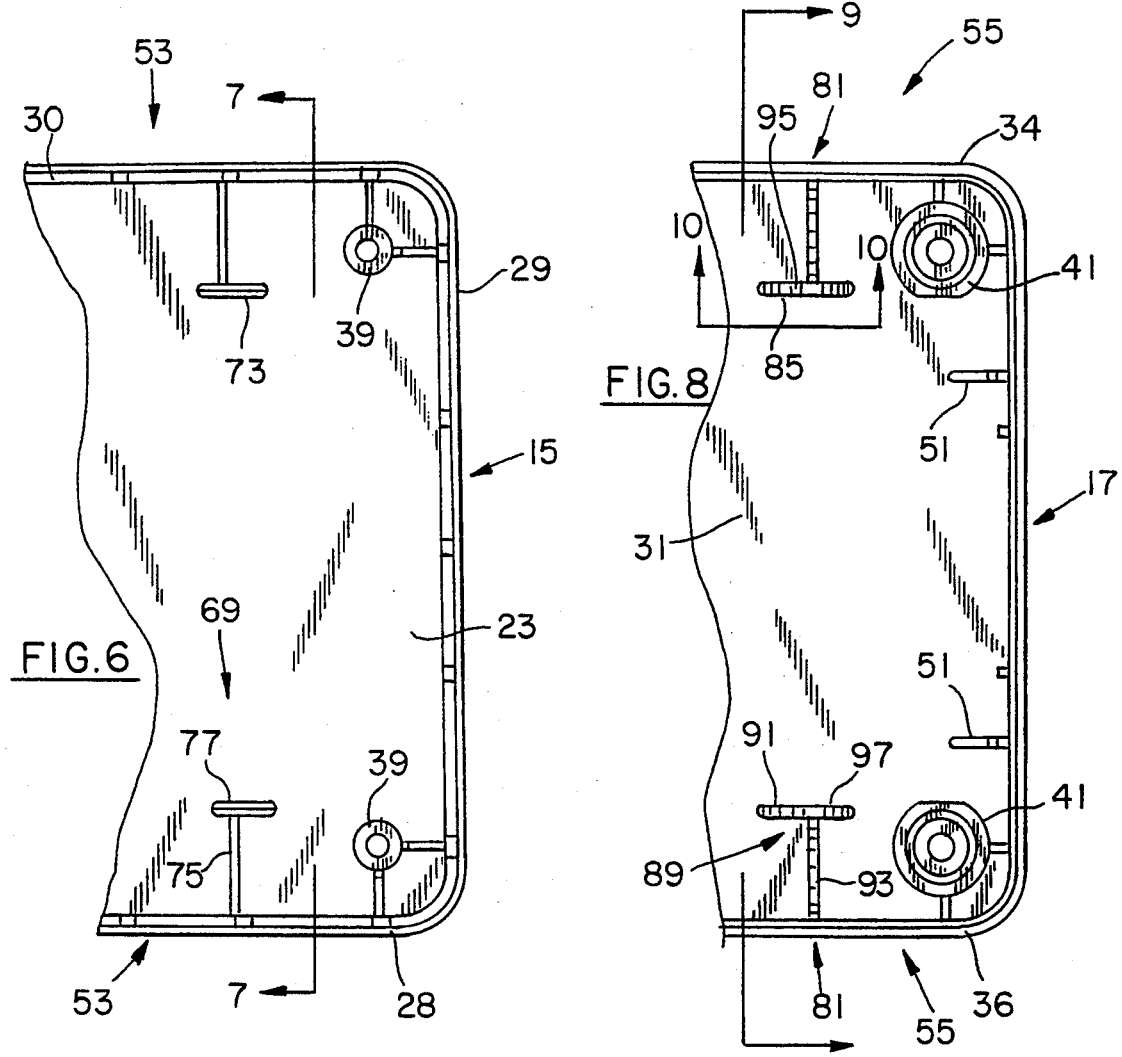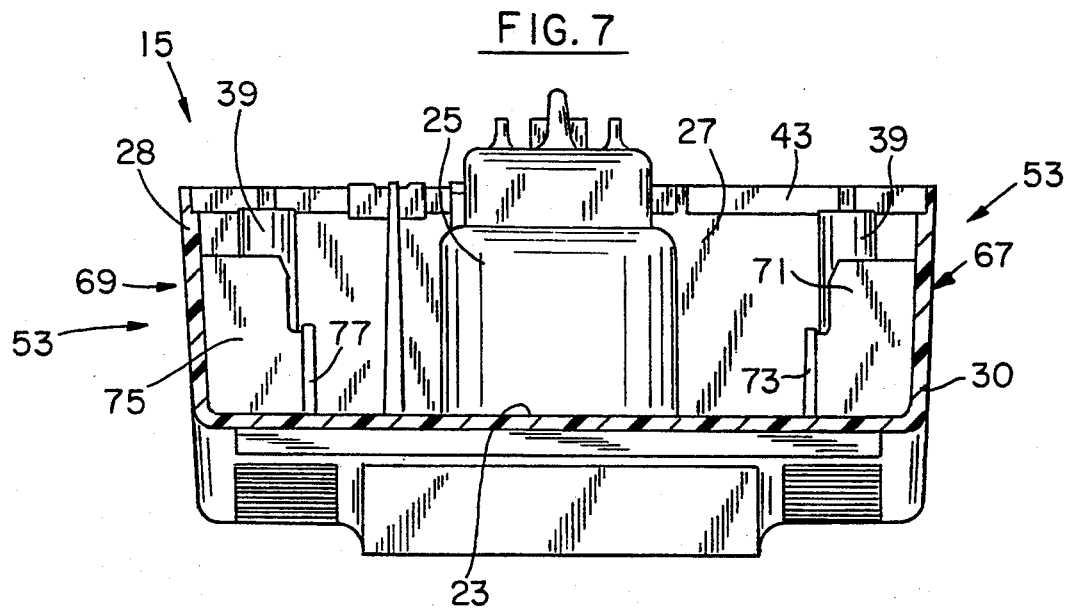

BATTERY CHARGER WITH CAPACITOR SUPPORT

FIELD OF THE INVENTION

This invention relates to electrical devices which have relatively large electrical components mounted within a housing and more particularly to supports for reliably and stably mounting such components in the housing.

BACKGROUND OF THE INVENTION

As shown in FIG. 11, one prior art battery charger 101 has a generally box shaped, clam shell housing 103 with a cover 105 and a base 107. A printed circuit board 109 is mounted in the base and extends generally parallel to a bottom wall 111 of the base portion. The battery charging circuit (not shown) formed in and supported on the circuit board 109 contains a relatively large cylindrical, spirally wound, metallized film capacitor 113 electrically connected in the circuit by pair of lead wires 115 (only one shown) extending respectively from the opposed ends of the capacitor. The capacitor film 117 is spirally wound on an axial core 119. In finished form, the ends of the capacitor are formed by the flush edges of the film 117 and core 119. To provide an impact and shock resistant mounting, the capacitor 113 is potted in a rectangular box shaped support 121 which is sandwiched between the cover 105 and base 107 of the housing 103. One side 123 of the support 121 is open for insertion of the capacitor 113 and potting material 125. The capacitor support 121 has a plurality of spaced legs 127, 129 extending integrally from a bottom wall 131 of the support and resting on the bottom wall 111 of the base 107. One leg 127 (only one shown) is located at each axial end of support 121. Two legs 129 (only one shown) are located adjacent the rear wall 130 of support 121. The support 121 and capacitor 113 extend above and across the surface of the circuit board 109 with the legs 127, 129 straddling the perimeter of the board. A cushion 135 is disposed between the upper surface of the top wall 137 of the capacitor support and the lower surface of the top wall 139 of the cover to provide a cushioned stable mounting within the housing 103. The engagement of the legs 127, 129 with the outside edges of the circuit board also contribute to the axial and transverse stability of the capacitor support 121.

Prior art chargers manufactured as described above provide adequate impact and shock resistance. However, they have been found to suffer from a number of disadvantages in automated manufacture and part cost. One disadvantage is that it was difficult to design a fixture for supporting the capacitor relative to the circuit board to solder the capacitor in circuit at the same time as other small components in an automated wave solder machine. Prior to running the board through the wave solder machine, the electrical components are loosely mounted on the circuit board by inserting the leads through openings in the board. Then the board is placed on a solder machine fixture which is moved between stations for soldering, washing and electrical testing of the circuit. Because the capacitor is large and unwieldy, it was not practical to mount the capacitor on the board for automated soldering and full functional testing of the completed pc board circuit at the last machine station. For this reason, the capacitor was inserted on the board and soldered manually following processing of the board in the wave solder machine. Following completion of these manual assembly steps, then a full functional test of the completed pc board circuit could be conducted. Therefore, the prior art charger required manual labor steps which would be desirable to automate.

A second disadvantage of the prior art charger is that the capacitor support and potting add labor and part cost to the product. The support and potting serve the sole purpose of providing a shock and impact resistant mounting for the capacitor. Therefore, the prior art charger required additional labor and part cost which could be reduced if a simpler, mechanically stable support could be developed.

SUMMARY OF THE INVENTION

Accordingly, a primary object of the invention is to provide an electrical device with a simplified, lower cost, less labor intensive, impact and shock resistance support for large electrical components connected in a printed circuit board circuit.

In accordance with one aspect of the invention as embodied and described herein, an electrical device comprises a housing having first and second opposed portions. The first housing portion has a wall and a first support fixed to and extending outwardly from the housing portion wall. The second housing portion has a wall and a second support opposed to the first support and fixed to and extending outwardly from the second housing portion wall. A printed circuit board is mounted in the second housing portion and has a circuit form thereon. An electrical component is electrically connected in the circuit and supported between the first and second supports.

Preferably, the first support comprises spaced first and second legs which engage respectively first and second end segments of the core.

The second support preferably comprises spaced first and second arms. Each arm preferably has a cradle formed by a fork and an abutment for receiving one core end segment. The legs and cradles restrict axial and transverse movement of the core.

The electrical device is preferably a battery charger. The electrical component mounted in the supports is preferably a spirally wound film capacitor comprising a core with a central segment and first and second end segments. The film is spirally wound on the central core segment with the end core segments exposed.

According to a second aspect of the present invention, a capacitor comprises a core having first and second spaced end segments and a central segment intermediate the first and second end segments. A main capacitor body comprising a pair of plates is wound on the central core segment. The main body has first and second end walls and a peripheral wall intermediate the first and second end walls. The first and second end segments extend respectively through and beyond the first and second end walls of the main body. The capacitor is particularly suitable for use in the electrical device discussed above and constituting the first aspect of the present invention.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in, and constitute a part of, this specification illustrate one embodiment of the invention and together with the description serve to explain the principles of the invention. In the drawings, the same reference numerals indicate the same parts. Also, some components that form no part of the present invention have been omitted for simplicity and clarity.

FIG. 2 is a plan view of the electrical device of FIG. 1 with the cover removed exposing the base portion of the device housing, a printed circuit board and a relatively large heavy electrical component mounted on the board.

FIG. 3 is a cross-sectional view taken along line 3—3 of FIG. 2.

FIG. 4 is a top plan view of the cover portion of the housing for the electrical device shown in FIG. 1.

FIG. 5 is a fragmentary cross-sectional view taken along line 5—5 of FIG. 4.

FIG. 6 is a fragmentary bottom plan view of the cover of the housing for the electrical device shown in FIG. 1 and taken along line 6—6 of FIG. 5.

FIG. 7 is a cross-sectional view taken line 7—7 of FIG. 6 and showing the cover portion of the housing upside down.

FIG. 8 is a fragmentary top plan view of the base portion of the housing for the electrical device of FIG. 1. The base portion is shown with the printed circuit board removed.

FIG. 10 is a fragmentary cross-sectional view taken along line 10—10 of FIG. 8.

DESCRIPTION OF THE PREFERRED EMBODIMENT

Figure 1:
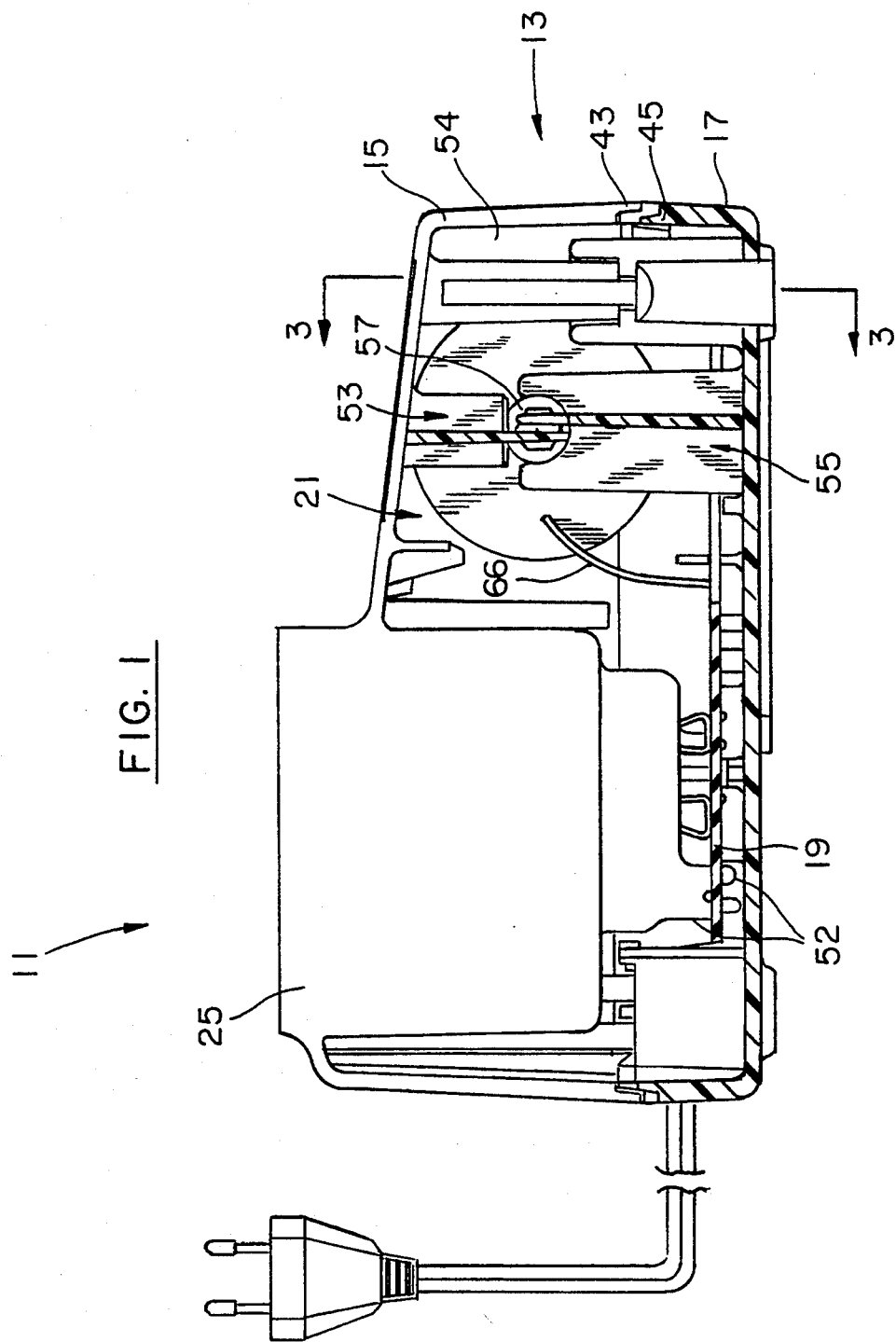
FIG. 1 is a cross-sectional view taken along line 1—1 of FIG. 2 of an electrical device in accordance with the present invention.
Figure 9:
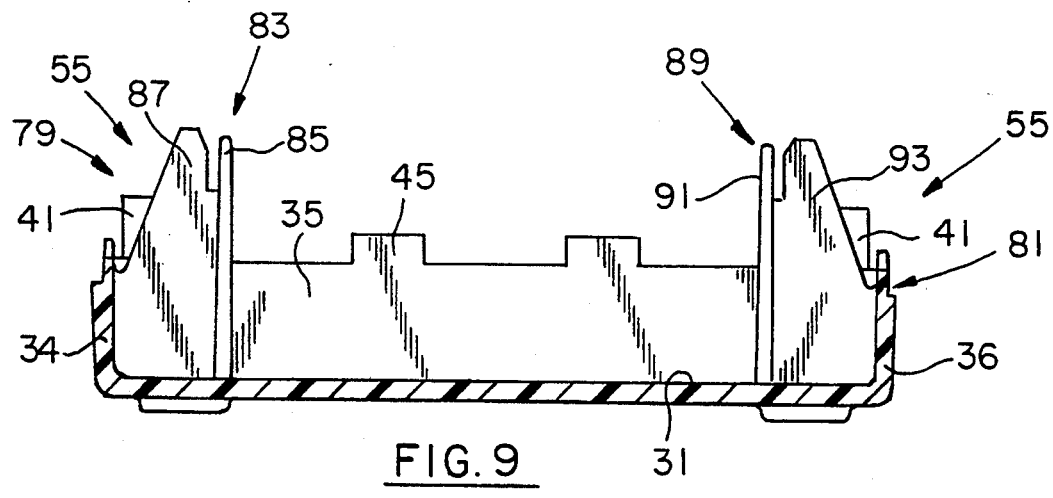
FIG. 9 is a fragmentary cross-sectional view taken along line 9—9 of FIG. 8.

The preferred embodiment of an electrical device in accordance with the invention is shown in FIG. 1. Details of the embodiment is shown in FIGS. 2-10.

In brief, as shown in FIGS. 1-3, electrical device 11 comprises a housing 13 having first and second opposed portions 15, 17, a printed circuit board 19 and an electrical component 21. As embodied herein, electrical device 11 is preferably a battery charger for detachable battery packs for cordless portable power tools such as drills and screwdrivers. In accordance with the invention, device 11 provides a low cost, shock and impact resistant support for electrical component 21 such as a capacitor within housing 13. As will be appreciated, the invention has general applicability to any other electrical device wherein the need arises to stably support a relatively large electrical component relative to a printed circuit board. This need arises most frequently in small portable electrical devices such as battery chargers and electrical test equipment.

In accordance with the invention, device 11 comprises housing 13 having first and second opposed portions 15, 17. As embodied herein, housing portion 15 shown best in FIGS. 1, and 4-7, forms a cover for housing 13 and comprises a top wall 23 with a battery pack receiving receptacle 25 formed therein and rectangular sidewalls 27-30. Second housing portion 17, shown best in FIG. 1, 2 and 8-10, has a bottom wall 31 and rectangular sidewalls 33-36. Cover portion 15 is joined to base portion 17 in a "clam shell" configuration through a plurality of screw bosses 39 formed on cover portion 15 and a plurality of mating screw bosses 41 formed on base portion 17. Additionally cover portion 15 is formed with a peripheral flange 43 for receiving a mating peripheral flange 45 formed on base 17.

In accordance with the invention, printed circuit board 19 (FIGS. 1-3) is mounted in the second housing or base portion 17 and has a circuit 49 formed thereon. As embodied herein, circuit 49 is a battery charging circuit which forms no part in the present invention. In FIGS. 1-3, the discrete components of circuit 49 except for component 21 have been omitted for simplicity and are schematically shown by a block diagram in FIG. 3. Board 19, which may be of any conventional construction, is supported in base portion 17 on a plurality of projections 51 (FIGS. 1, 2, 8, 10) extending from wall 31 and sidewalls 34-36. A plurality of pins 52 (FIGS. 1, 3 and 7) extending from receptacle 25 and a rib 54 (FIGS. 1,5) extending from sidewall 29 engage and hold board 19 securely in base portion 17 against projections 51.

In accordance with the invention, electrical component 21 (FIGS. 1-3) is electrically connected in circuit 49 and is supported between first and second supports 53, 55 extending, respectively, from cover portion 15 and base portion 17. As embodied herein, component 21 is preferably an a.c. metallized film capacitor and comprises a core 57 having a central segment 59 and first and second end segments (or posts) 61, 63. A main capacitor body 151 (FIGS. 2, 3) has first and second end walls 153, 155 (e.g., of epoxy) and a peripheral wall 157 (e.g., of mylar) intermediate the first and second walls 153, 155. Main body 151 comprises a pair of capacitive plates 159,161 wound on central core segment 59. First and second end segments (or posts) 61, 63 extend respectively through and beyond the first and second end walls 153, 155 of main body 151. Plate 159 comprises a flexible substrate, (e.g., of polyester), a conductive film 165 (e.g., of aluminum) formed on substrate 163, and an electrical lead 167 connected to film 165. Similarly, plate 161 comprises a flexible substrate 169, a conductive film 171 and an electrical lead 173. Electrical leads 167 and 173 electrically connect respectively plates 159, 161 of capacitor 21 in circuit 49.

The components of capacitor body 151 are illustrated in cross section schematically in FIG. 3 for simplicity. For example, it will be recognized that the size of plates 159, 161 are greatly enlarged in FIG. 3 and that plates 159, 161, in actuality, would have numerous layers surrounding core 57 rather than two layers as illustrated in FIG. 3.

Plates 159, 161 may be formed, wound and sealed on core 57 using conventional film capacitor technology. The inventive contribution provided by capacitor 21 is that end segments 61, 63 extend through and beyond end walls 153, 155 sufficiently to serve as a means for stably and reliably supporting capacitor 21 within the housing 13 of device 11.

To exemplify the size and weight of capacitor 21 typically in accordance with the preferred embodiment, capacitor 21 has main body 151 approximately 71 cm in length, 37 cm in diameter and a total weight including core 57 of 82 grams. Component 21 may also be constituted by an inductor or any other relatively large heavy electrical component.

In accordance with the invention, first housing or cover portion 15 (FIGS. 4–7) has first support 53 fixed to and extending outwardly from the first housing portion wall 23. The second housing portion 17 (FIGS. 8–10) has the second support 55 opposed to the first support 53 and fixed to and extending outwardly from the second housing portion wall 31. As embodied herein, supports 53, 55 (FIGS. 1–3) preferably engage and support the first and second posts or end segments 61, 63 of component 21. First support 53 (FIGS. 1, 3 and 5–7) preferably comprises first and second spaced legs 67, 69 which engage respectively end segments 61, 63. Leg 67 has a pair of perpendicularly abutting walls 71, 73 extending from top wall 23 and sidewall 28. Wall 71 abuts the end of end segment 61 and serves to restrict axial movement of core end segment 63. Wall 73 abuts the side of core end segment 61 and serves to restrict transverse movement of core end segment 63. Similarly, leg 69 includes perpendicularly abutting walls 75, 77 for engaging and restricting, respectively, axial and transverse movement of core end segment 63.

Alternatively, not preferred and not shown, supports 53, 55 may be arcuate and engage main body 151 of capacitor 21 directly. In this approach, dimensional tolerance must be maintained to avoid damaging the capacitor film-during assembly. Also, the subjection of the capacitor to a strong shock or impact could lead to damage of the capacitor. Similar problems such as those would apply to an inductor or other electrical component supported in this manner.

As embodied herein, second support 55 (FIGS. 1–3, 8–10) comprises spaced first and second arms 79, 81 which engage respectively first core end segment (or post) 61 and second core end segment or post 63. Arms 79, 81 are located adjacent opposed edges of board 19 such that component 21 extends across the surface of board 19. Arm 79 includes a cradle 83 for end segment 61 formed by a fork 85 and an abutment or wall 87. Fork 85 and abutment 87 restrict respectively transverse and axial movement of end segment 61. Similarly arm 81 includes a cradle 89 formed by fork 91 and abutment or wall 93 for restricting respectively transverse and axial movement of end segment 63. For accommodating dimensional variation in the part sizes and to ensure a tight fit, each fork 85, 91 has a plurality of crushable ribs 95, 97 (FIGS. 8, 10) extending parallel to core 57. When the cover and base portions 15, 17 are joined during assembly, ribs 95, 97 are crushed as supports 53, 55 are moved toward each other to clamp core 57 therebetween.

It will be appreciated from the foregoing, that an electrical device in accordance with the present invention provides a simplified lower cost, less labor intensive, impact and shock resistant support for relatively large heavy electrical components, such as a capacitor, connected in a printed circuit board. These advantages flow not only from the simplicity of mounting component 21 within housing 13 but also from the simplified manufacture and testing of the pc board 19. The manufacture of component 21 with end segments 61, 63, which project beyond main body 151, enable component 21 to be held simply and securely on a support of a wave solder machine fixture. The fixture support for component 21 may be identical to support 55 on base portion 17. To assemble and test board 19, first, all of the discrete electrical components including component 21 are machine inserted or manually located on board 19 in the required locations to complete circuit 49. Then, board 19 is placed in a fixture of a wave solder machine and is moved between successive stations of the machine to solder the components in board 19, to wash board 19 and lastly, to conduct a full functional test for circuit 49. As will be appreciated, the large, relatively heavy component 21 may now be assembled and soldered at the same time as the smaller components. As a result, circuit 49 is completed following the soldering station in the wave solder machine and a full functional test can be conducted in a subsequent station of the wave solder machine.

Figure 11:
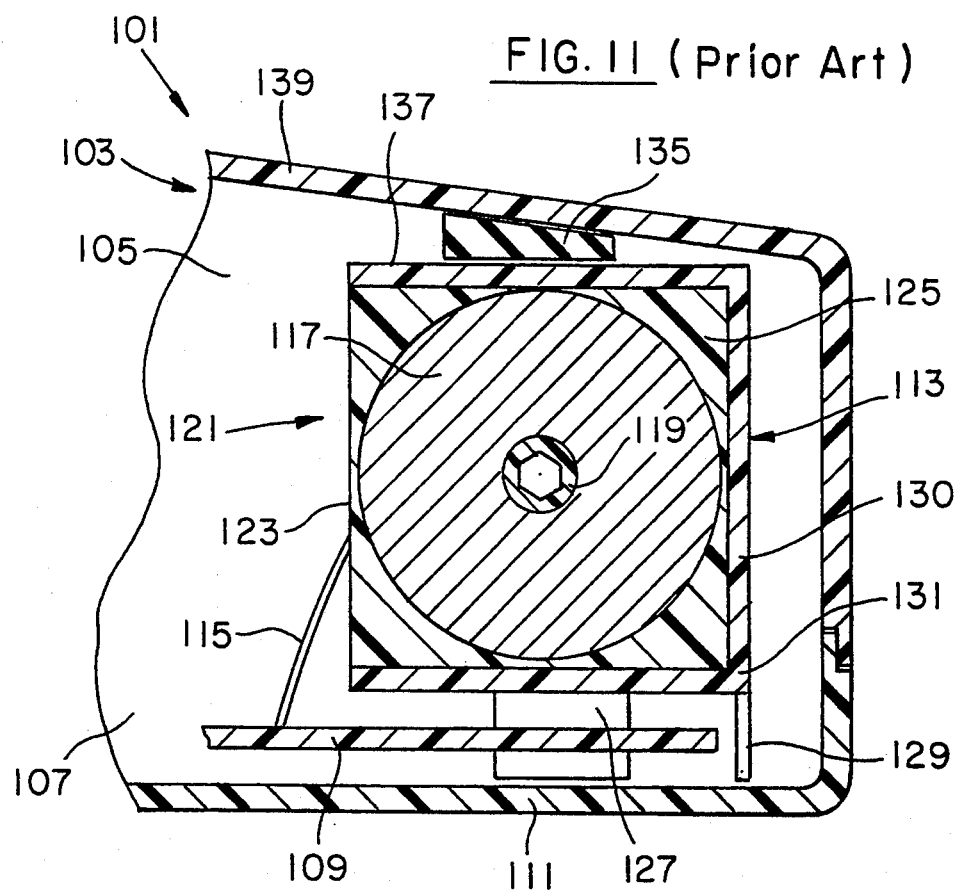
FIG. 11 is a simplified fragmentary cross-sectional view of a prior art battery charger. The cross-section is taken transverse to the longitudinal axis of the large electrical component and approximately midway between the circular end walls of the component. The view in FIG. 11 is taken in the same direction as the cross-sectional view of the present invention shown in FIG. 1.

Following testing, board 19 is then ready for assembly into base portion 17 by placing board 19 in base portion 17 with the periphery of the board resting on projections 51 and with end segments 61, 63 located in cradles 83, 89. Through conventional techniques, the board is then connected to a suitable cord and plug for connection to an ac power source. Then cover portion 15 is then joined to base portion 17 with peripheral flanges 43, 45 engaged. A plurality of screws are then installed into mating screw bosses 39, 41. When cover and base portions 15, 17 are properly joined, core 17 is clamped between supports 53, 55. To restrict axial movement, wall 71 and abutment 87 engage the end of end segment 61; and wall 75 and abutment 87 engage the end of end segment 63. To restrict transverse movement, wall 73 and fork 85 engage the side of end segment 61; and wall 77 and fork 91 engage the side of end segment 63. Thus, by comparison to prior art charger shown in FIG. 11, the present invention reduces part cost by the elimination of support 121 and potting material 125. Additionally, the labor associated with potting capacitor 113 is now eliminated.

It will be apparent to those skilled in the art that various modifications and variations can be made in the electrical device of the present invention without departing from the scope or spirit of the invention. Thus, it is intended that the present invention cover these modifications and variations provided they come within the scope of the appended claims and their equivalents.

I claim:

1. An electrical device comprising:
    a housing having first and second opposed portions;
    the first housing portion having a wall and a first support fixed to and extending outwardly from the first housing portion wall;
    the second housing portion having a wall and a second support opposed to the first support and fixed to and extending outwardly from the second housing portion wall;
    a printed circuit board mounted in the second housing portion and having a circuit formed thereon; and
    a spirally wound film capacitor electrically connected in the circuit and comprising (1) a core having central segment and first and second end segments and (2) a capacitive film spirally wound on the central core segment with the end core segments exposed, the end core segments engaged by, supported between, and restricted against axial and transverse movement by the first and second supports.

2. The device of claim 1 wherein:

the first support comprises spaced first and second legs, the first leg engages the first core end segment, and the second leg engages the second core end segment; and the second support comprises spaced first and second arms, the first arm engages the first core end segment and the second leg engages the second core end segment.

3. The device of claim 2 wherein:

the first and second arms each have a cradle for receiving, respectively, the first and second core end segments;

the first and second legs hold the first and second core end segments within the cradles; and the legs and cradles restrict axial and transverse movement of the core.

4. The device of claim 3 wherein each cradle has a fork for restricting transverse movement of the core and an abutment for restricting axial movement.

5. A battery charger comprising:

a clam shell housing having a cover and a base;

the cover having a wall and first support fixed to and extending outwardly from wall;

the base having a wall and a second support opposed to the first support and fixed to and extending outwardly from the wall;

a printed circuit board mounted in the base and having a circuit formed thereon; and a spirally wound film capacitor electrically connected in the circuit and comprising (1) a core having central segment and first and second end segments and (2) a capacitive film spirally wound on the central core segment with the end core segments exposed, the end core segments engaged by, supported between, and restricted against axial and transverse movement by the first and second supports.

6. The charger of claim 5 wherein:

the second support comprises spaced first and second arms, the first arm is located adjacent to one edge of the board and engages the first core end segment, and the second arm is located adjacent to a second edge of the board opposite to the first edge and engages the second core end segment; and the capacitor extends across the surface of the board.

7. The charger of claim 6 wherein:

the first and second arms each have a cradle for receiving, respectively, the first and second core end segments;

the support comprises first and second legs engaging and holding, respectively, the first and second core end segments within the first arm cradle and the second arm cradle; and the legs and cradles restrict axial and transverse movement of the core.

8. The charger of claim 7 wherein each cradle has a fork for restricting transverse movement of the core and an abutment for restricting axial movement of the core.

9. An electrical device comprising:

a housing having first and second opposed portions;

the first housing portion having (1) a wall and (2) a first support comprising first and second legs fixed to and extending outwardly from the first housing portion wall;

the second housing portion having (1) a wall and (2) a second support opposed to the first support and comprising first and second arms fixed to and extending outwardly from the second housing portion wall;

a printed circuit board mounted in the second housing portion and having a circuit formed thereon;

an electrical component electrically connected in the circuit, supported between the first and second supports and having a main body and first and second spaced posts extending respectively from the body;

the first leg and first arm engaging and supporting the first post; and the second leg and second arm engage and support the second post.

* * * * *